United States Patent Office 2,991,156
Patented July 4, 1961

2,991,156
METHOD FOR REMOVING IRON FROM AQUEOUS CONCENTRATED ALKALI METAL HYDROXIDE SOLUTIONS
William I. Childs, Midland, Mich., assignor to The Dow Chemical Company, Midland, Mich., a corporation of Delaware
No Drawing. Filed Apr. 10, 1959, Ser. No. 805,380
3 Claims. (Cl. 23—184)

This invention concerns a new method for removing iron contaminant from an aqueous concentrated alkali metal hydroxide solution wherein the concentrated alkali metal hydroxide solution is contacted with a water-insoluble resinous polymeric chelate exchange resin having tris(hydroxymethyl)aminomethane (THMAM) chelate exchange groups.

Up to the time of this invention no ion exchange resin was known which effectively removed iron contaminant from aqueous concentrated alkali metal hydroxide solutions.

It has now been discovered in accordance with this invention that a THMAM substituted, water-insoluble, crosslinked copolymer of a mixture of an aromatic hydrocarbon having a vinyl group as its sole aliphatic unsaturation (preferably styrene) and a copolymerizable crosslinking agent which contains at least two $CH_2$=CH- groups (preferably divinylbenzene, DVB) the crosslinking agent being present in amounts equal to ca. 0.2 to 16 weight percent of said monovinylaryl hydrocarbon, preferentially absorbs and removes contaminant iron from aqueous concentrated alkali metal hydroxide solutions. Whether the iron is complexed or chelated is not known.

The resins used in the practice of this invention are advantageously made by reacting a water-insoluble but swellable vinylbenzyl sulfonium halide resin, halide being inclusive of chloride and bromide, or equivalent mineral acid salt, with THMAM in aqueous medium at a reaction temperature between ca. 50° and 100° C. for a time sufficient to displace sulfonium halide groups. Generally, a reaction time of about 12 to 24 hours is required. At least an amount of THMAM sufficient to react with the sulfonium halide groups is used and preferably an excess. The amount of excess can be recovered and is therefore not important.

The vinylbenzyl sulfonium halide resins advantageously used in making the complexing or chelate exchanging resins used in the process of this invention are advantageously the reaction products of resinous vinylaryl polymers, such as those of styrene, vinyltoluene, vinylxylene, chlorostyrene, dichlorostyrene, vinylnaphthalene, acenaphthene, etc., crosslinked advantageously to the extent of between 0.2 and 16 percent, with crosslinking agents such as divinylaryl hydrocarbons, and containing an average of between about 0.25 and 1.5 halomethyl groups per aromatic nucleus, with a sulfide of the group which contains up to two alkyl groups containing between one and four carbon atoms and/or, correspondingly, up to two hydroxyalkyl groups containing between two and four carbon atoms, e.g., dimethyl, diethyl, dipropyl, methyl hydroxyethyl, dibutyl sulfide; polymethylene sulfides and alkyl substituted polymethylene sulfides having 4 to 12 carbon atoms, e.g., dimethyl, diethyl, dipropyl, methyl hy- the balance being from 1 to 4 carbon alkyl groups, pursuant to the procedure of copending U.S. patent application Serial No. 769,545, filed October 27, 1958. The vinylbenzyl sulfonium resin can be reacted in the halide form, as produced, or it can be converted to other ionic forms before reaction, e.g., the sulfate form.

The vinylbenzyl sulfonium halide resin obtained is heated in aqueous medium with at least a sufficient amount of THMAM to displace the sulfonium groups and to substitute THMAM groups. In the reaction, the amine salt of the halide or equivalent anion displaced is formed.

The utility of this resin in removing contaminant iron from aqueous concentrated alkali metal hydroxide solutions was most surprising, since iron levels are consistently reduced to less than 5 p.p.m. and even less than 1 p.p.m. By an aqueous concentrated alkali metal hydroxide solution is meant aqueous 15 to 50 weight percent sodium hydroxide or equivalent alkali metal hydroxide solution (i.e., from ca. 9 to 15 percent lithium hydroxide up to a maximum of 75 percent francium hydroxide, dependent upon their water solubilities). A purified alkali metal hydroxide from which iron has been removed can be recovered as a concentrated aqueous solution following contact with a THMAM resin.

In practice, an aqueous concentrated alkali metal hydroxide solution containing iron impurity is contacted with the water-wet settled THMAM resin in base form. Surrounding liquid is then withdrawn after a contact time sufficient to reduce the iron content to the desired level, as determined by a simple test, to give a purified aqueous alkali metal hydroxide solution. In column operations, generally flow rates of less than 0.1 g.p.m./ft.$^2$ bed cross sectional area to ca. 1.0 g.p.m./ft.$^2$ are used to reduce iron content to below 1 p.p.m., depending upon the viscosity of the solution being treated, the particle size of the resin, and the amount of crosslinking of the resin. Again, a simple test suffices to show the feed rate required in given instances to give desired products. As would be expected, higher feed rates give products having higher iron concentration, other variables being equal. The resin is regenerated by using a dilute mineral acid wash, generally a 1–6–N mineral acid, e.g. sulfuric acid.

The following examples describe specific embodiments of this invention. They set forth the best mode contemplated by the inventor for carrying out his invention without being limitative thereof.

*Example 1*

A quantity of 25 ml. of a THMAM resin (prepared by heat reacting at 75° to 90° C. an excess of THMAM in water with a polyvinylbenzyl dimethylsulfonium chloride resin ca. 1 weight percent crosslinked with DVB and containing 0.38 meq. sulfonium chloride/ml. wet settled volume) was placed in a 50 ml. buret containing a glass wool plug as a bed support. It was rinsed with 100 ml. deionized water, then 500 ml. of aqueous 50 weight percent sodium hydroxide containing 15.6 p.p.m. iron (100 percent sodium hydroxide basis) was passed through the bed at 0.1 g.p.m./ft.$^2$ Effluent sodium hydroxide iron content was 0.3 p.p.m. (100 percent sodium hydroxide basis).

*Example 2*

The resin of Example 1 was regenerated by contacting it with 50 ml. 2–N sulfuric acid, then rinsing with 250 ml. deionized water. A quantity of 500 ml. of aqueous 50 weight percent sodium hydroxide containing 15.6 p.p.m. of iron (100 percent sodium hydroxide basis) was again passed through at the same flow rate as in Example 1. A sodium hydroxide effluent was obtained containing 2.6 p.p.m. iron (100 percent sodium hydroxide basis). The resin was again regenerated in the same way and 1 liter of similar iron contaminated 50 percent sodium hydroxide was then passed through at the same flow rate. An effluent was obtained having an average iron content of 3.1 p.p.m. (100 percent sodium hydroxide basis). Similar advantageous results are obtained when equivalent concentrated alkali metal hydroxide solutions containing contaminant iron are substituted for the sodium hydroxide of Examples 1 and 2.

What is claimed is:

1. The method for preferentially absorbing and removing iron from an aqueous concentrated alkali metal hydroxide solution containing iron which method comprises contacting said solution with an insoluble crosslinked copolymer of a mixture of a monovinylaryl monomer having the vinyl group as its sole aliphatic unsaturation and a copolymerizable crosslinking agent which contains at least two groups of the structure $CH_2\!=\!CH\!-\!$, said crosslinking agent being present in amount equal to 0.2 to 16 weight percent of said monovinylaryl hydrocarbon, said copolymer having attached to the aryl nuclei an average of about 0.25 to 1.5 $-NH-C(CH_2OH)_3$ groups per aryl nucleus and removing the surrounding alkali metal hydroxide solution from said copolymer.

2. The method of claim 1, wherein the alkali metal hydroxide solution is a 15 to 50 weight percent sodium hydroxide solution.

3. The method of claim 1, wherein the monovinylaryl hydrocarbon is styrene and the crosslinking agent is divinylbenzene.

References Cited in the file of this patent

UNITED STATES PATENTS

| | | |
|---|---|---|
| 2,789,036 | Tillman | Apr. 16, 1957 |
| 2,813,838 | Lyman et al. | Nov. 19, 1957 |

UNITED STATES PATENT OFFICE
CERTIFICATE OF CORRECTION

Patent No. 2,991,156                                     July 4, 1961

William I. Childs

It is hereby certified that error appears in the above numbered patent requiring correction and that the said Letters Patent should read as corrected below.

Column 1, line 63, strike out "e.g., dimethyl, diethyl, dipropyl, methyl hy-" and insert instead -- from 4 to 8 of which are polymethylenic, --.

Signed and sealed this 20th day of March 1962.

(SEAL)
Attest:

ERNEST W. SWIDER
Attesting Officer

DAVID L. LADD
Commissioner of Patents